United States Patent [19]

Clyde

[11] 4,222,434
[45] Sep. 16, 1980

[54] CERAMIC SPONGE HEAT-EXCHANGER MEMBER

[76] Inventor: Robert A. Clyde, P.O. Box 430820, South Miami, Fla. 33143

[21] Appl. No.: 900,513

[22] Filed: Apr. 27, 1978

Related U.S. Application Data

[63] Continuation-in-part of Ser. No. 870,030, Jan. 16, 1978, abandoned.

[51] Int. Cl.³ ............................................. F28F 21/04
[52] U.S. Cl. ........................................ 165/10; 138/38;
165/104 S; 165/109 R; 165/133; 165/159;
165/162; 165/164; 165/181; 165/185;
165/DIG. 4; 165/DIG. 8; 165/DIG. 10
[58] Field of Search ................. 165/185, 133, DIG. 8,
165/DIG. 10, 10, 104 S, 109, 159, 160, 161,
162, 164, 181, DIG. 4; 428/178, 311, 312, 313;
138/38

[56] References Cited

U.S. PATENT DOCUMENTS

| | | | |
|---|---|---|---|
| 2,799,793 | 7/1957 | De Cain | 165/185 |
| 2,977,265 | 3/1961 | Forsberg et al. | 165/DIG. 8 |
| 2,994,203 | 8/1961 | Lackey et al. | 165/185 |
| 3,549,423 | 12/1970 | Grubb et al. | 428/312 |
| 4,073,999 | 2/1978 | Bryan et al. | 428/312 |
| 4,136,428 | 1/1979 | Godsey et al. | 165/133 |

*Primary Examiner*—Sheldon Richter
*Attorney, Agent, or Firm*—James C. Kesterson; Robert E. Pitts

[57] ABSTRACT

A heat-exchanger composed of a body of ceramic sponge defining randomly located interconnected walls bounding a plurality of randomly located interconnected cavities and a plurality of elongate heat-conductive members embedded in the body and having a surface in heat-exchanging relation with the body and an end zone at the surface of the body and another opposite end zone which is located depthwise in the body, so that, heat may be conducted between the interior of the body and the surface of the body along the heat-conductive members. The heat-conductive members may be of suitable material, such as silicon carbide or metallic glass. In another case a silicon carbide rod is attached to a ceramic plate so as to conduct heat directly from one side of the plate to the other. A method of increasing the efficiency of a tube heat exchanger with sponge baffles is described. A method of resistance heating of an auto catalytic converter is detailed.

22 Claims, 9 Drawing Figures

CERAMIC SPONGE HEAT-EXCHANGER MEMBER

This is a continuation-in-part of U.S. patent application Ser. No. 870,030, filed Jan. 16, 1978, now abandoned.

FIELD OF THE INVENTION

This invention relates to heat-exchangers and, more particularly, to a heat-exchanger composed of a rigid open cell sponge-type body having outwardly extending heat-conductive elements embedded therein for transmission of heat between the inner zones of the body and the surface zone of the body.

BACKGROUND OF THE INVENTION

Extended surface metal heat-exchangers are known. For example, a radiator of a car or a home air conditioner unit embody such heat-exchangers. Extended surface metal heat-exchangers are used because the heat transfer coefficient on the gas side is low, so the area exposed on the gas side is increased. Recuperator tubes of mullite or silicon carbide are used at high temperatures to recover heat because there have been catastrophic failures of metal tubes due to high temperatures. Silicon carbide conducts heat better than mullite, but silicon carbide is brittle and expensive and has to be encapsulated with an oxygen resistant material when used in an oxygen atmosphere at high temperatures. It would be desirable if an extended area heat-exchanger of mullite could be made. It would be even more desirable if the heat-transfer characteristics of silicon carbide could be used; and if the brittleness of the silicon carbide could be overcome, and if the unit could be coated with a metal or a catalyst. Hague International Co. of South Portland, Maine makes a silicon carbide recuperator tube 4 foot long and 4 inches in outside diameter with fins, but the outside area is only 9.8 square feet and the inside area only 3.14 square feet and, generally speaking, it is of limited dimension. The fins are parallel to the gas flow and promote streamline flow instead of turbulent flow. It would be most desirable if these areas could be substantially increased since the heat transferred is proportional to the area. Because of the temperature limitations on the bonding agent for the silicon carbide it would also be desirable to have an extended area heat-exchanger that would operate at high temperatures, and that would promote turbulent flow instead of streamline.

When a ceramic based catalyst is put inside a pipe, as in an auto catalytic converter, it is very desirable to be able to heat it up quickly, because the catalyst is not effective at low temperatures when the car is first started. U.S. Pat. No. 3,768,982 of Kitzner describes a heater but heat must pass through a barrier to heat the catalyst. Parallel hole monoliths are hard to heat because the heat must pass through the ceramic, even when coated with a metal, but in a sponge, heat is conducted via conduction in a zig-zag fashion. A silicon carbide insert in a parallel hole monolith would block holes, but in a random hole sponge, the silicon carbide is easily by-passed. If a hole in a parallel hole monolith becomes plugged with carbon, coal or soot from combustion products, or MMT (methylcyclopentadienyl) manganese tricarbonyl, a fuel additive used to increase gasoline octane) the entire length of the hole is blocked; in a random hole sponge, any block is easily by-passed. Likewise, in an exothermic reaction like methanation, heat can be removed more efficiently in a random hole sponge because the hot gases can contact the inside of the pipe. In an endothermic reaction like reforming it is necessary to put heat into the reaction, instead of removing heat. Uniformity of temperature promotes specificity, i.e., only the reaction desired takes place instead of another reaction at a higher temperature. Heat transfer with pellets is poor because of point-to-point contact.

In a ceramic heat wheel with a catalyst, it is necessary to coat the entire wheel with an expensive catalyst such as platinum.

Glass tube and shell heat exchangers are corrosion resistant but have relatively poor heat transfer coefficients.

OBJECTS OF THE INVENTION

It is an object of this invention to supply a ceramic heat exchanger that transfers heat quite efficiently.

It is also an object of this invention to provide an improved heat exchanger which utilizes an open cell sponge-type body of interconnected walls with an inner zone and an outer zone and a plurality of elongate heat-conductive members, which may be of silicon carbide or other suitable material, such as metallic glass to conduct heat through the sponge-type body from the inner zone to the outer zone.

It is a further object of the instant invention to provide a ceramic heat exchanger that will operate at high temperatures.

It is also an object of this invention to supply a heat exchanger that has an extended area on both sides of a divider instead of on only one side.

It is a further and additional object of this invention to provide a heat exchanger which is coated with a metal to improve its heat exchanging characteristic. It is also an object of this invention to provide a heat exchanger which is coated with a catalyst.

It is a further object to provide a heat exchanger that promotes turbulence to improve heat transfer.

It is an additonal object and specific object to provide a heat exchanger that supports silicon carbide so that the silicon carbide or equivalent material will be less subject to breakage when subjected to the vibration of a car or plane.

It is also an object of this invention to provide a heat exchanger which is characterized by a low pressure drop to materials flowed therethrough.

It is another object of this invention to provide a heat exchanger which supplies a substitute for the ceramic heat wheel in which only the hot side after incineration need be platinum coated.

It is another object of this invention to increase the efficiency of a tube heat exchanger.

It is a further object of this invention to increase the speed with which an auto catalytic converter can be heated prior to starting.

It is a general object of this invention to provide an improved, inexpensive heat exchanger of simple construction which is adapted to utilize the beneficial qualities of certain materials and to provide for this utilization by a structure orienting and supporting the same.

GENERAL DESCRIPTION OF THE INVENTION

The fundamental equation in heat transfer is that heat transferred is equal to the overall heat transfer coefficient times the area times the difference in temperature.

The overall heat transfer coefficient is governed by the resistance through the film on one side, the conductance of the separator and the resistance of the film on the other side. Very often, especially in the case of gases, the fluid film is more resistant to heat transfer than the solid separator, and this is why it is so important to have an extended area on the gas side. It is also important to have turbulent flow instead of streamline, because the heat transfer coefficient is higher for turbulent flow. In streamline (parallel) flow, there is a layer of stagnant gas that resists heat transfer and resists contact of gas with catalyst.

The plastic precursor of the sponge is often polyurethane foam which can be cut in curved shapes by Tenneco Chemical Co. as shown in FIGS. 3, 4, 6 and 8. It has been found that by cutting the foam into shapes as in FIGS. 3, 4, 6 and 8 that less pressure drop is incurred, and good turbulence and heat transfer is still realized. Instead of flat plates, a spiral configuration can be used, involving counter current flow of hot and cold fluids. FIG. 1 shows the inserts 16, 16', 18, 18', 20, 20' of silicon carbide or other ceramic. FIG. 2 is an enlarged view of the sponge. FIG. 3 shows the plate 46 which separates the material to be heated and cooled, as well as more inserts 60, 60', 60" which transmit heat and prevent the sponge from breaking. FIG. 4 shows irregularly cut sponge to promote more turbulence in hot and cold fluids. FIG. 5 shows the sponge around a tube which separates hot and cold material. The tube 104 can be made of silicon carbide, mullite, glass, graphite, tantalum, zirconium, titanium, stainless steel or other ceramics. One fluid flows inside the tube and the other flows outside, either parallel to or transverse to the tube. FIG. 6 is similar to FIG. 3, except the separating plates have fins 230 which project into the openings and provide moe area for heat transfer. This separating plate, if ceramic, can be one piece with the sponge to provide good contact. The separating plate can be metal, however, material to be heated or cooled goes between the fin and the sponge.

A polyurethane foam 5 to 50 pores/inch with an open cell structures such as VELVE TM (Tenneco Chemicals, Inc.) open pore foam is particularly useful. In a typical preparation, after the sponge-like material is cut to the desired shape, it is soaked in a slurry of the ceramic precursor and thereafter squeezed to remove excess material so that only the sponge fibers are coated. If it is desired to insert a silicon carbide rod, a small hole is cut in the sponge and the rod is inserted. The coated sponge is then dried and heated to the maturing temperature of the ceramic material and then cooled. If metallic glass material, as described hereinafter, is used instead of silicon carbide, then, the glass is inserted after the heating to the maturing temperature. Since the thermal expansion of silicon carbide is $4.7 \times 10^{-6}$ cm/cm/oC and that of mullite is $6 \times 10^{-6}$ cm/cm/oC, the mullite will contract more on cooling and hold the silicon carbide firmly. If the use of the unit involves temperatures higher than the bonding agents for the silicon carbide or involves chlorine which may attack silicon carbide, the silicon carbide can be coated with mullite, metal or other suitable coatings. One purpose of the rod as shown in FIGS. 3, 4 and 6 is to prevent breakage of the sponge points, so several layers can be clamped one on top of the other, with a spring to take care of expansion. The final element is comprised of the selected ceramic material which may be chosen from virtually any one of numerous such materials including crystalline types such as porcelain, mullite, alumina, zirconia, zircon, cordierite, fosterite, spodumene, perovskite, steatite, magnesia, silicon carbide, silicon nitride, beryllia and the like, as well as the glassy types such as borosilicates, sodalime, flint, plate, alumina silicate, silica (quartz) and the like.

The elements of this invention can be further treated to increase efficiency and/or durability. Thus, the elements may contain a wash coat to increase effective surface area as more fully described in SAE Paper 730276 (1973) and in "DISPAL M", "A Unique, New And Versatile Alumina For The Ceramic Industry" presented by Robert J. Butler at the 24th Pacific Coast Regional Meeting of the American Ceramic Society (Nov. 2, 1971). A smooth wash coat such as terra sigilatta or high area wash coat such as gamma alumina, glazes, wallastonite, diatomaceous earth, or fine glass fibers, all attached using gamma alumina or the like, can be applied. Durability of the elements can be improved by plating metal on top of the ceramic or wash coat by conventional means or vapor deposition as described in U.S. Pat. No. 3,900,646 or 3,998,758 by Robert A. Clyde.

An advantage of vapor deposition is that the metal is applied free of pores and protects the plated piece from corrosion. The metal can be doped with boron or the like. The silicon carbide can be protected from chlorine with nickel or the like.

EXAMPLE I

Referring to U.S. Pat. No. 3,900,646, Example 13, measurements of heat conductivity were made on a nickel coated sponge. The same apparatus was repeated except a plain uncoated sponge was used and also an uncoated one with silicon carbide inserts. Quite unexpectedly, the uncoated sponge was found to conduct heat nearly as well as the nickel coated one. The one with silicon carbide inserts conducted best. Results are as follows:

| TIME Min. | T°C. $H_2O$ Around Uncoated Sponge | T°C. $H_2O$ With Silicon Carbide Inserts |
|---|---|---|
| 0 | 24 | 24 |
| 10 | 30 | 33 |
| 21 | 58 | 65 |

EXAMPLE II

A finned ceramic similar to that described in U.S. Pat. Nos. 4,017,347 and 3,255,027 was used in an experiment similar to Example I. It was found that the sponge without silicon carbide conducted heat faster. In the finned U.S. Pat. Nos. 4,017,347 and 3,255,027 it is necessary to use thin sections for heat transfer. In FIG. 7 of this invention a thick plate 300 would withstand higher pressures.

USES

The sponge of this invention would be useful in auto catalytic converters where it is imperative to heat up the catalyst quickly. It is necessary to remove the heat of formation in the methanation of coal gas and to supply heat for a reforming reaction such as the production of hydrogen in a precombustion catalyst as described in the Nov. 3, 1975 Aviation Week and Space Technology magazine page 46 where a 30% larger cruise range was obtained on a piston engine aircraft tested by the Jet Propulsion Lab. In this case, air was preheated by passing it around the outside of the shell containing the catalyst.

Rotary ceramic heat wheels are used to recover heat from incineration of vapors from hospitals, paint, and printing plants. The entire wheel must be coated with platinum. If a non-rotating exchanger of this invention were used, only the hot side would require platinum and the cold side could be a more efficient metal extended surface exchanger.

The heat exchanger (without catalyst) could be used as a recuperator for very hot gases from kilns or furnaces or to cool chlorine or sulfuric acid, or to absorb hydrochloric acid.

Recuperator tubes are used in the aluminum, steel, forging and heat treating industries, in soaking pits, billet and slab heating furnaces, ceramic heating furnaces, and cement kilns. Mirrors which concentrate the suns heat into a small space, require a high temperature heat exchanger. The sponge of this invention would be useful in a thermal storage unit where hydrides are used to store heat during slack periods and give it up during peak demands.

Sponge baffles would increase the heat transfer of a shell and tube heat exchanger because of the high area of the sponge.

Incineration of pesticides, herbicides, or compounds containing chlorine often requires the corrosion resistance of ceramic Corrosive salt water could be used for cooling.

In accordance with the foregoing objects and the general description of the invention, the instant invention will now be described with reference to the accompanying drawings, in which:

DESCRIPTION OF THE PREFERRED EMBODIMENT

Figure 1:
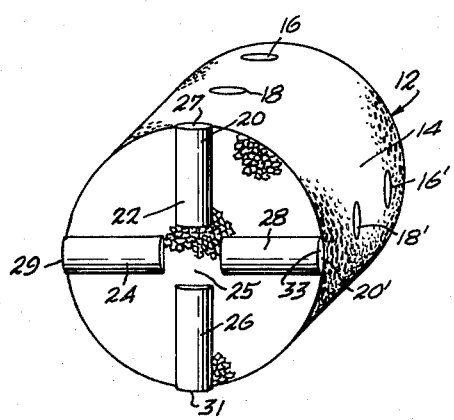
FIG. 1 is a perspective view of a sponge-like body having the insert supplied radially therein.

Referring to the drawings wherein like reference characters designate like or corresponding parts through the several views and referring to FIG. 1, numeral 12 generally designates a heat transfer device which is composed of a sponge-like body 14 in which there are arranged at axially located zones as indicated by the numerals 16, 16', 18, 18' and 20, 20' a heat transfer arrangement of elements. In the preferred embodiment these elements are silicon carbide and as shown in the frontal plane of FIG. 1, each composes a cylindrical body such as 22, 24, 26, and 28, each of which are angularly spaced with respect to one another and extend radially outwardly from a central zone 25 to a tip such as 27, 29, 31 and 33 at the surface. In use, heated gas or liquid flowing through the sponge axially will transfer heat to the radially extending elements to be conducted to the terminal ends at the surface, or vice versa from the surface to the central zone. The elements of silicon carbide are relatively brittle or breakable and while silicon carbide is shown as an example, it is recognized that other materials might be utilized to rigidify the sponge-type body or so that the sponge-type body rigidifies and strengthens a relatively brittle elongate cylindrical body because of its particular material. The device is especially useful in the silicon carbide embodiment. Metallic glasses, as described in Chemical and Engineering News, dated Dec. 19, 1977, at page 7, can be used instead of silicon carbide to transmit heat. A rod or ribbon can be formed. One containing iron, nickel and boron is more corrosion resistant than stainless steel, and the thermo-conductivity approaches that of metals.

Figure 2:
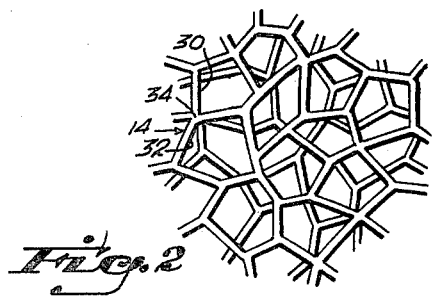
FIG. 2 is an enlarged partial view of a portion of the sponge-like body of FIG. 1 and generally indicating its structure.

As shown in FIG. 2, the body 14, which surrounds the silicon carbide member in the embodiment referred to above, is composed of a network of open cellular construction. This lends surrounding reinforcement of rigidity of a prop-up nature all along the length of the radially extending conductive elements of silicon carbide imparting to it a physical strength which overcomes its inherent brittleness. This is because the many portions of the open cellwork 30 and 32 which are joined as at 34 come in contact with the radially extending elements along the lengths thereof, each contact adding an increased increment of strength and support.

Figure 3:
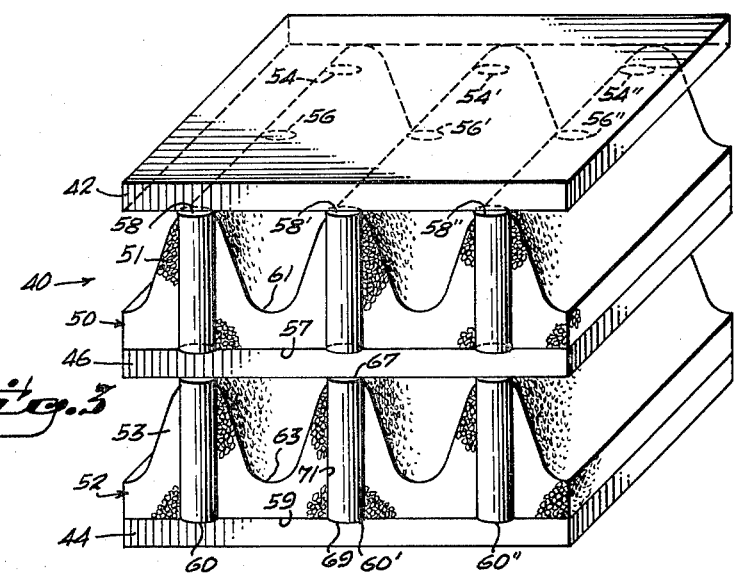
FIG. 3 is a partial view of a heat transfer medium constructed in accordance with this invention.

Referring to FIG. 3 a somewhat different construction for a heat transfer element 40 is shown. In this embodiment an upper plate 42 and a lower plate 44, which are in generally parallel relation to one another and spaced from one another are provided on opposite sides of a parallel medially extending plate 46. Between these heat conductive plates, a body such as that designated by the numeral 50, between the upper plates 42 and 46, the middle plate; and the body 52, between the middle plate 46 and the lower plate 44, is provided. Each of the bodies, 50 and 52 comprises a piece of the sponge-like material designated by the numerals 51 and 53 each of which has a planar surface such as 57 and 59 each of which abuts the plate 46 and each of which has a pattern in relief comprising the outer or upper surface, which may be the wave form indicated by the lines 61 and 63 indicating crests and troughs. Between the upper portions such as 67 and the lower end 69, a bore 71 is provided and in each of these bores a heat-conductive element is provided. There is thus provided a plane as indicated by the lines 54, 54', 54"; 56, 56', 56" and 58, 58' and 58" within which a zone at the end of each of the conductive elements is arranged in parallel relation and each of which extends from an upper end in abutting engagement with one of the plates to a lower end in abutting engagement with the medial or middle plate. This similar construction is arranged in the lower body 53 and the conductive elements 60, 60' and 61" are in a plane common with that designated by the numerals 58, 58' and 58"; however, these planes may be staggered if desired. In any event, gas flowing through the space comprising the troughs and between the plates will transfer heat with the result that it will be conductive outwardly by the pillars of conductive material to the plate, which may be finned or any other suitable heat-conductive technique utilized to remove or extract the heat from the gas.

Figure 4:
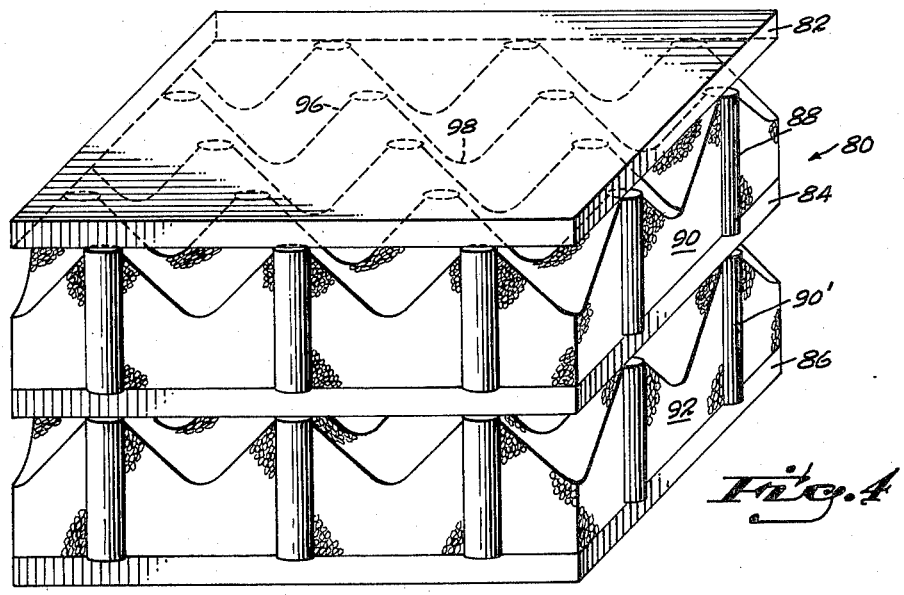
FIG. 4 is a perspective view of a heat transfer device constructed in accordance with this invention.

With reference to FIG. 4, a body designated by the numeral 80 is provided again utilizing plates 82, 84 and 86 in spaced parallel relation and each of which are spanned by a plurality of pillars such as 88 and 90' which are embedded in the sponge-like beds 90 and 92, the top surfaces of which define a pattern in relief composed of high areas such as 96 and low areas 98 and wherein the pillars extend from the high areas to the base, with their ends being at the surface to transfer heat to the plates in the manner indicated above.

Figure 5:
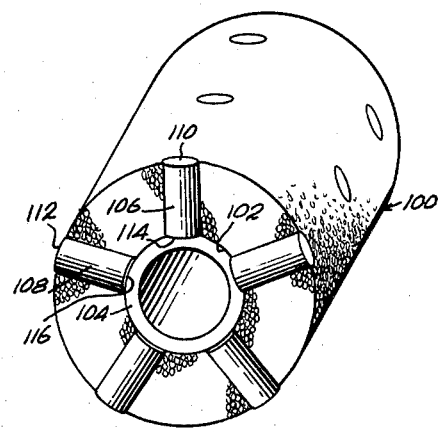
FIG. 5 is a slightly modified form of the invention from that shown in FIG. 1.

Referring to FIG. 5, which somewhat resembles FIG. 1, it is seen that there is provided a cylindrically configured axially extending sponge-like body 100 having a central through bore 102 within which there is nested a sleeve 104 of heat-conductive material with the result that the radially extending heat-conductive members such as 106 and 108 with their external surfaces 110 and 112 at the surface of the cylinder and with their inner ends 114 and 116 in engagement with the surface of the inner sleeve 104 for conducting heat.

Figure 6:
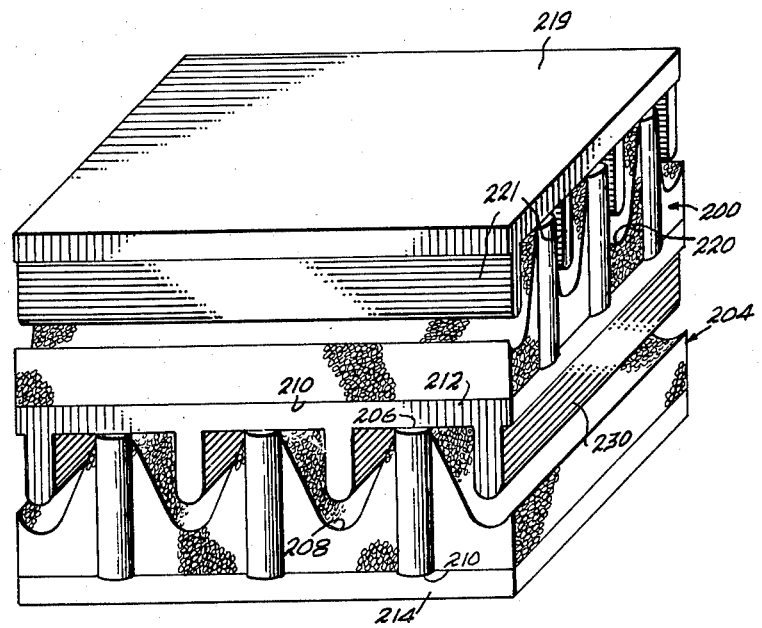
FIG. 6 is a perspective view of a somewhat modified version of the instant invention.

Referring to FIG. 6, it is seen that the sponge-like bodies 200 and 204 each are provided with high and low areas in a pattern in relief such as the high area 206 and the low area 208. Each of the sponge-like bodies includes a flat surface, such as 210 in engagement with a conductive plate 214. The high and low areas define channels or pathways along the low areas which in the case of the body 204 are designated 208. The channels or pathways along the low area of the upper body 200 are designated by the numeral 220. The heat exchanger of this embodiment is provided with a middle plate 212 which includes a plurality of heat-conductive fins or fingers which are of heat-conductive material, see that designated by the numeral 230. These fins extend longitudinally in the space defined by the low areas in this embodiment. Thus, when gas or liquid flows through the low areas, it is in contact with the extending finger or fin in heat-exchanging relation. Similarly, the top plate 219 has downwardly extending fingers, such as 221, for a similar purpose. In the embodiment shown, the flow-through channels of the upper body are right angularly arranged with respect to those of the lower channels. It will be seen that the silicon carbide pillars are provided for the heat-conductive purposes described above, silicon carbide being the type of member used in this preferred embodiment.

Where metallic glass is used, instead of being in post or column form, thin ribbons may be threaded through the body from the surface to an inner part or portion, so as to extend from the surface to an inner zone for the purposes of conducting heat therebetween; and, in accordance with the teachings herein, the end of the ribbon is attached to a plate or header at the surface to rapidly remove heat by conduction, the attachment of the ribbon to the header being by welding, which gives a good contact. Since metallic glass is electrically conductive, if desired, in this embodiment, it may be used as a resistor of a resistance heater and, when connected electrically to a power source, it may be used to heat the body of the sponge internally.

Figure 7:
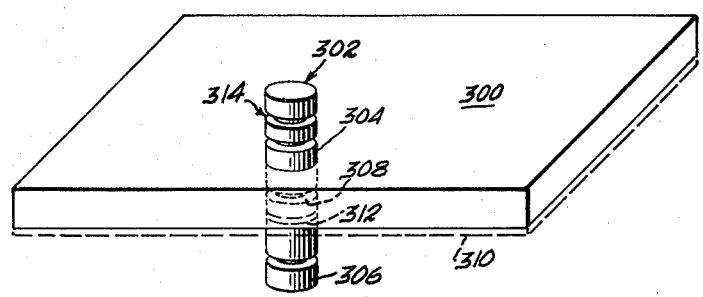
FIG. 7 is a perspective view of an alternative embodiment of the heat exchange device.

Referring to FIG. 7, there is disclosed a means to fasten a silicon carbide rod in such a fashion as to extend from both main sides of a plate which divides the hot and cold side of a heat exchanger. The plate is designated by the numeral 300, the silicon rod is designated by the numeral 302, and its end extending in one direction by the numeral 304 and its end extending in the other direction by the numeral 306. A suitable process for making such a heat exchanger is as follows. A notch 308 is provided in the periphery of the silicon carbide rod. After this is done the rod is inserted through a hole in a piece of cardboard, which is shown in dotted lines and designated by the numeral 310, the hole being indicated by the numeral 312. It will be noted that the notch is just above the plane of the cardboard. Ceramic material which has been wetted is placed on this cardboard with a portion of it extending into the circumferential or peripheral notch in the silicon carbide. In other words, the notch is in the mid-zone of a bed of wet ceramic material. When dried and heated to the maturing temperature of the ceramic, the silicon carbide is firmly secured to the ceramic material and the cardboard is burned out by the heat. Since the silicon carbide conducts heat better than the ceramic, it is very effective in transferring heat from the hot to the cold side. That is, from one side to the other side of the ceramic heat exchanger that results. A similar method may be used using a tube instead of a flat plate, it being realized that the flat plate is merely representative of a surface through which the silicon carbide rod extends and is affixed thereto by the above process and that silicon carbide rods could be provided extending radially inwardly and outwardly of the wall of a tube. In addition to the uses mentioned above, the heat exchanger can be used to preheat air for a magneto hydro dynamic, known as an MHD, or to cool a laser or nuclear reactor. In an MHD higher pressures are necessary and can be provided by a thicker plate 300. Heat from a nuclear source could decompose water to hydrogen. Several notches, as indicated in FIG. 7, see 314 may be cut for a slightly modified arrangement wherein different plates are utilized and a gang cut using several rotary diamond saw blades at once can increase the area of the silicon carbide by making its surface irregular.

Figure 8:
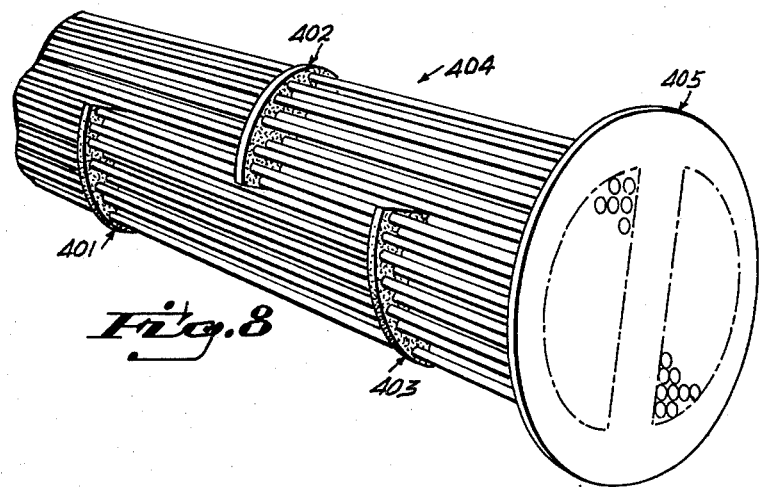
FIG. 8 is a tube exchanger with baffles of sponge ceramic.

Referring to FIG. 8 there is shown an alternative embodiment of the invention which is composed of tube means 404 with baffle means such as 401, 402, and 403, in a preferred embodiment so that, liquid flowing through the tube means is affected by fluid flowing about the tube means and constrained by the baffle means to a tortuous flow path about the tube means. In a conventional embodiment of the invention, the tube means would be jacketed by a fluid impervious material with an inlet and an outlet to the space between the baffle means jacket and tube means to flow fluid about the tube means. The jacketing means could be any type of suitable container with an inlet and an outlet and, hence, is not shown in the drawings, it being noted, however, that a tube sheet such as that shown by the numeral 405 may be utilized for the purpose of orienting and spacing the tubes of the tube means. In the preferred embodiment illustrated, the tube means is composed of a plurality of parallel spaced separate tubes of a common diameter and, preferably, of a common length, spaced in a predetermined pattern and oriented and maintained in spaced relation by the tube sheet and wherein the baffle means is composed of a plurality of spaced plates of ceramic sponge material axially spaced from one another and each being arranged about the outside of a portion of the tube means to define the tortuous flow path for fluid about the baffle means.

In FIG. 8 ceramic sponge baffles, such as 401, 402 and 403 increase the heat transfer area of a tube heat exchanger. To make good contact a silicate air hardening cement is sprayed between the tubes and the sponge. The tubes can be glass, metal, ceramic, or graphite. Borosilicate glass and also several of the 400 series stainless steels have low coefficients of thermal expansion so expansion of the tube will not break the ceramic.

Figure 9:
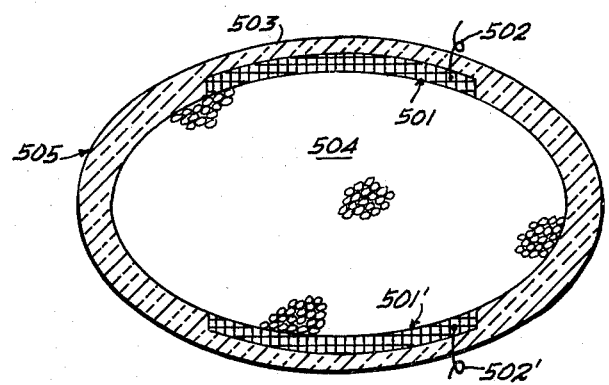
FIG. 9 is an end view of an auto catalytic converter with wire mesh on the top and bottom to provide for resistance heating.

Referring to FIG. 9, there is shown a body 504 which may be in the form of an elongate strip of elliptical cross section and which is composed of a sponge of the type described herein of sponge-like material. It is seen that it includes a lower surface and an upper surface and that in the lower surface as well as the upper surface there is an elongate strip of wire mesh material such as that designated by the numerals 501 and 501' each of which is provided with a conductor or electrode such as 502 and 502'. Suitable insulation material such as that designated by the numeral 503 is provided about the combination described above and in its totality the same is designated generally by the numeral 505. In use, the electrodes 502 and 502' are electrically connected to opposite sides of an energy source so that, when energized, current is constrained to flow between the wire strip portions 501 and 501' and through the body of the ceramic sponge-like material.

In FIG. 9 wire mesh 501 protects the ceramic sponge from vibration damage and has electrical connections 502 and 502' which connect to a power source so that the catalytic metal in the ceramic sponge body 504 acts as a resistance heater. An alternate method would be to thread resistance wires through the sponge. If the ceramic were made of perovskite which conducts electricity somewhat, the perovskite could act as a resistance heater and a parallel hole monolith could be heated by resistance heating. Insulation 503 prevents electric short circuits.

What is claimed is:

1. A heat exchanger for use in high temperature environments comprising:
a body of non-resilant ceramic sponge comprising randomly located and interconnecting walls bounding a plurality of randomly located interconnected cavities, said cavities of said ceramic sponge representing substantially more volume than said interconnecting walls, said body defining external surfaces, said external surfaces having a sharp and rough texture resulting from said interconnecting walls abruptly terminating to form said external surfaces, and said body further having an internal zone; and
a plurality of non-resilant elongated heat-conductive members snugly embedded in said body, each of said members suitable for withstanding extreme temperatures, and having a first end portion, a mid-portion, and a second end portion, said first end portion of each member intersecting a portion of said external surfaces, and said mid-portion of each member being located within said internal zone, said members for conducting heat between said external surfaces and said internal zone of said body.

2. The device as set forth in claim 1 wherein said members are cylindrical in shape.

3. The device as set forth in claim 1 wherein the heat-exchanger is provided with a metallic coating.

4. The device as set forth in claim 1 wherein said external surfaces of said body comprises an upper surface and a lower surface and said upper surface comprises a pattern in relief with high areas and adjacent low areas.

5. The device as set forth in claim 4 wherein each of the high areas is aligned in a continuous crest and each of the low areas is aligned in a continuous trough and a wave form surface is provided.

6. The device as set forth in claim 4 wherein the high and low areas comprise staggered elevated areas and staggered lower areas.

7. The device of claim 4 wherein said lower surface is substantially planar, and said first end portion of each member intersects portions of said high areas of said upper surface and said second end portion of each member intersects said lower planar, surface.

8. The device of claim 7 and further comprising a first plate of ceramic material in contact with said first end portion of each of said members and said high areas of said upper surface, and a second plate of ceramic material in contact with said second end portions of each of said members and said planar surface.

9. The device of claim 8 wherein selected one of said members extend through selected ones of said first and second ceramic plates.

10. A heat exchanger comprising:
a body of ceramic sponge comprising randomly located and interconnecting walls bounding a plurality of randomly located interconnected cavities, said body defining external surfaces and having an internal zone;
and a plurality of elongated heat-conductive members embedded in said body, each of said members being made from a material selected from a group consisting of silicon carbide and metallic glass, and each of said members embedded in said body having a first end portion, a mid-portion and a second end portion, said first end portion of each member intersecting a portion of said external surfaces, and said mid-portion of each member being located within said internal zone, said members for conducting heat between said external surfaces and said internal zone of said body.

11. The device of claim 10 wherein the heat-exchanger is provided with a metallic coating.

12. The device of claim 10 wherein said body defines an external surface having a cylindrical shape characterized by a longitudinal center line, and each of said members is in a spaced relation from one another radially oriented with respect to said center line such that said first end portion terminates on said cylindrical external surface.

13. The device of claim 12 wherein said cylindrical body further defines an axially bore extending therethrough, and said device further comprises a heat-conductive liner means located in said bore such that said second end of each of said members in an abutting heat-exchanging relation with said liner means.

14. The device of claim 10 wherein said external surfaces of said body comprise an upper surface and a lower surface, and said upper surface comprises a pattern in relief with high areas and adjacent low areas.

15. The device of claim 14 wherein each of the high areas is aligned in a continuous crest and each of the low areas is aligned in a continuous trough, such that a wave form surface is provided.

16. The device of claim 14 wherein the high and low areas comprise staggered elevated areas and staggered lower areas.

17. The device of claim 14 wherein said lower surface is substantially planar and said first end portion of each member intersects portions of said high areas of said upper surface and said second end portion of each member intersects said lower planar surfaces.

18. The device of claim 17 and further comprising a first plate of ceramic material in contact with said first end portion of each of said members and said high areas of said upper surface, and a second plate in contact with said second end portion of each of said members and said planar surface.

19. The device of claim 18 wherein selected ones of said members extend through selected ones of said first and second ceramic plates.

20. The device as set forth in claim 19 wherein said device includes means interconnecting said selected members and said selected plates; and said means comprises a peripheral notch in said member and said ceramic material filling said notch.

21. The device as set forth in claim 19 wherein said selected member is provided with an exterior surface which is irregular increasing the surface area thereof to enhance the heat exchanging proprieties thereof.

22. A heat exchanger comprising a body of ceramic sponge comprising randomly located interconnected walls bounding a plurality of randomly located interconnected cavities, said body defining a surface of spaced walls and an internal central zone; and said body having a first and a second parallel spaced main surface and one of said main surfaces comprising a pattern in relief defining high and low area; and a sheet of conductive material overlaying and in engagement with the high areas and in engagement with the other of said surfaces.

* * * * *